United States Patent [19]
Miller

[11] Patent Number: 5,595,293
[45] Date of Patent: Jan. 21, 1997

[54] WALLET FOR CONTAINING A COMPACT DISC, AND FABRICATION METHOD

[75] Inventor: William R. Miller, La Puente, Calif.

[73] Assignee: Rembrandt Photo Services, City of Commerce, Calif.

[21] Appl. No.: 455,015

[22] Filed: May 31, 1995

Related U.S. Application Data

[63] Continuation-in-part of Ser. No. 326,540, Nov. 20, 1994, which is a continuation-in-part of Ser. No. 145,253, Oct. 29, 1993, and a continuation-in-part of Ser. No. 14,817, Oct. 29, 1993, Pat. No. Des. 353,837.

[51] Int. Cl.⁶ .......................... B65D 85/57; B31B 19/14; B31B 19/60
[52] U.S. Cl. .................. 206/308.1; 206/312; 206/459.5; 493/199
[58] Field of Search ..................................... 206/307, 311, 206/312, 313, 308.1, 387.13, 457, 459.5; 229/68.1; 156/250, 267, 290; 493/199, 203

[56] References Cited

U.S. PATENT DOCUMENTS

| | | |
|---|---|---|
| D. 240,816 | 8/1976 | Peterson . |
| D. 242,960 | 1/1977 | Stanley . |
| D. 261,155 | 10/1981 | Nast . |
| D. 262,040 | 11/1981 | Wihlke . |
| D. 304,781 | 11/1989 | Hanson . |
| D. 316,107 | 4/1991 | Lockner . |
| D. 316,180 | 4/1991 | Hines . |
| D. 318,068 | 7/1991 | Trug et al. . |
| D. 325,817 | 5/1992 | Call . |
| D. 345,765 | 4/1994 | Fritz . |
| 429,752 | 6/1890 | Camp . |
| 821,019 | 5/1906 | Cooke, Jr. . |
| 1,029,836 | 6/1912 | Warne . |
| 1,168,634 | 1/1916 | Hoffman . |
| 1,186,312 | 6/1916 | Hanselmann . |
| 1,315,696 | 9/1919 | Alstrand . |
| 1,459,457 | 6/1923 | Wilburger . |
| 1,563,034 | 11/1925 | Levine . |
| 2,463,450 | 3/1949 | Wisner . |
| 2,500,773 | 3/1950 | Robins . |
| 2,881,912 | 4/1959 | Kursh . |
| 3,422,952 | 1/1969 | George . |
| 3,443,686 | 6/1969 | Raymond . |
| 3,446,260 | 5/1969 | Osher . |
| 3,473,653 | 10/1969 | Nunes . |
| 3,688,898 | 9/1972 | Stanton . |
| 3,722,564 | 3/1973 | Croon . |

(List continued on next page.)

FOREIGN PATENT DOCUMENTS

| | | |
|---|---|---|
| 0022973 | 6/1948 | Finland . |
| 0642651 | 9/1928 | France . |
| 1194784 | 11/1959 | France . |
| 0125897 | 5/1919 | United Kingdom . |

OTHER PUBLICATIONS

Specimen of double page for "CD Wallet" product Model No. PCD32; Alpha Enterprises, Inc. (First Version), 1993.
Specimen of double page for "CD Wallet" product Model No. PCD32; Alpha Enterprises, Inc. (Second Version), 1993.
Specimen of double page for "CDPreserver" product; Pride Plastics.
"Specimen of ProSleeve" CD sleeve; Case Logic, Inc.
Cover page and pp. 32–33 of 20th Century Plastics Catalog, Jan. 1991, California.

*Primary Examiner*—Jimmy G. Foster
*Attorney, Agent, or Firm*—David Weiss

[57] ABSTRACT

A CD wallet with an entrapped graphics sheet and dedicated to the storing of a particular CD corresponding to the graphics on the entrapped graphics sheet, together with a method for fabricating the dedicated CD wallet. The wallet is fabricated of flexible panels of thermoplastic sheet material, and the entrapped graphics sheet includes two parallel scores thereon and is preferably of greater rigidity than the plastic panels, permitting the plastic panels to bend along the scores on the entrapped graphics sheet to form a spine when the graphics sheet is folded along the scores.

30 Claims, 7 Drawing Sheets

U.S. PATENT DOCUMENTS

| | | |
|---|---|---|
| 3,864,755 | 2/1975 | Hargis . |
| 4,043,477 | 8/1977 | Deese . |
| 4,076,874 | 2/1978 | Giovanelli et al. . |
| 4,263,357 | 4/1981 | Holson . |
| 4,327,831 | 5/1982 | Inaba et al. . |
| 4,339,034 | 7/1982 | Panveno . |
| 4,365,708 | 12/1982 | Tyus . |
| 4,413,298 | 11/1983 | Pecsok et al. . |
| 4,447,973 | 5/1984 | Wihlke . |
| 4,473,153 | 9/1984 | Colangelo . |
| 4,508,366 | 4/1985 | Brindle . |
| 4,538,730 | 9/1985 | Wu . |
| 4,549,568 | 10/1985 | Sfikas . |
| 4,566,590 | 1/1986 | Manning et al. . |
| 4,610,352 | 9/1986 | Howey et al. . |
| 4,620,630 | 11/1986 | Moss . |
| 4,623,062 | 11/1986 | Chase et al. . |
| 4,676,374 | 6/1987 | Wilkins . |
| 4,699,268 | 10/1987 | Oishi . |
| 4,704,042 | 11/1987 | Eisen et al. . |
| 4,709,812 | 12/1987 | Kosterka . |
| 4,762,225 | 8/1988 | Henkel ................................. 206/308.1 |
| 4,778,047 | 10/1988 | Lay . |
| 4,778,051 | 10/1988 | Schaub et al. ..................... 206/387.13 |
| 4,793,477 | 12/1988 | Manning et al. . |
| 4,850,731 | 7/1989 | Youngs . |
| 4,966,283 | 10/1990 | Sykes et al. ....................... 206/387.13 |
| 4,971,195 | 11/1990 | Mitsuyama . |
| 5,085,318 | 2/1992 | Liverick . |
| 5,087,145 | 2/1992 | Cooley . |
| 5,154,284 | 10/1992 | Starkey . |
| 5,207,717 | 5/1993 | Manning . |
| 5,312,507 | 5/1994 | Miller ..................................... 156/290 |

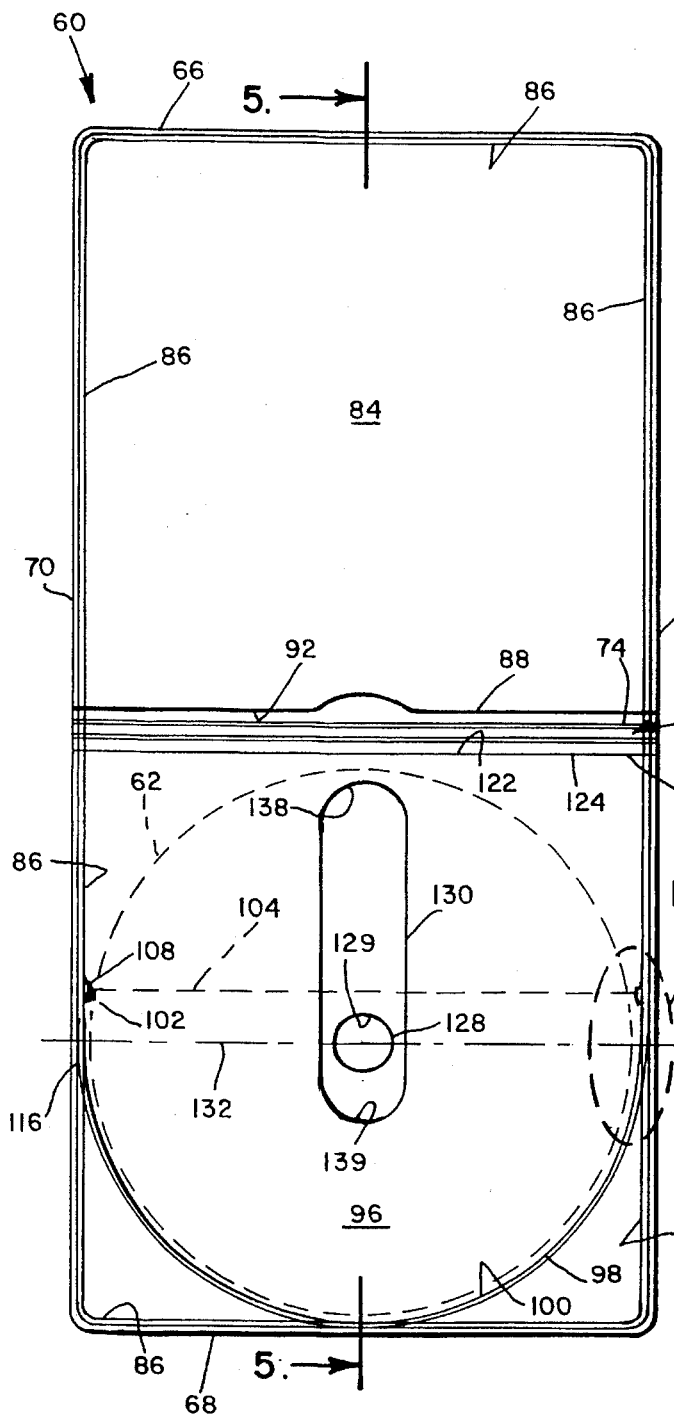
Fig. 4.
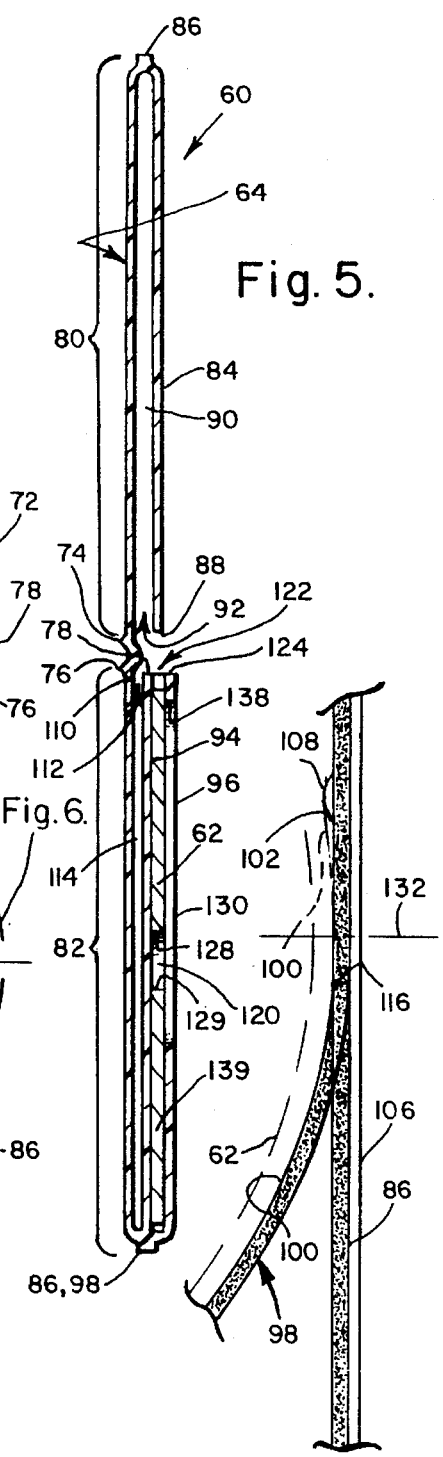
Fig. 5.
Fig. 6.

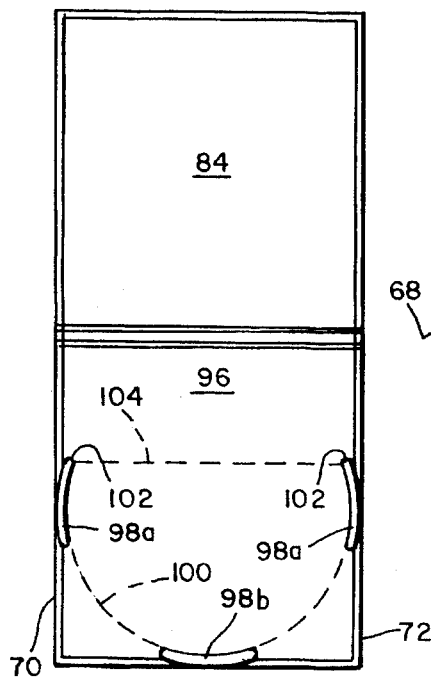
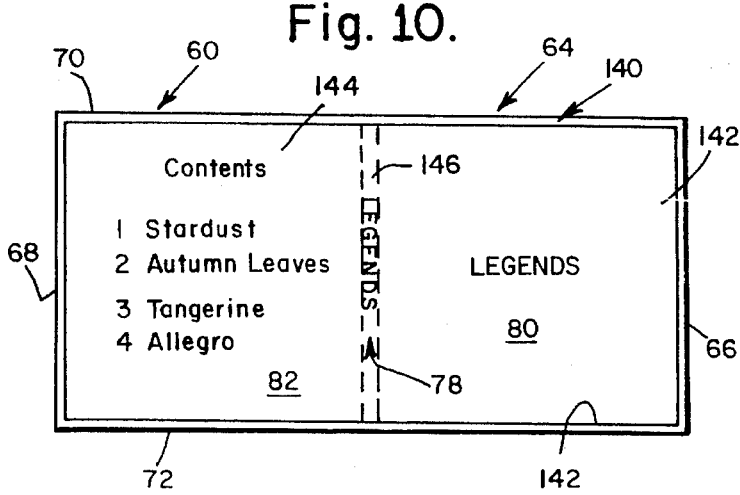
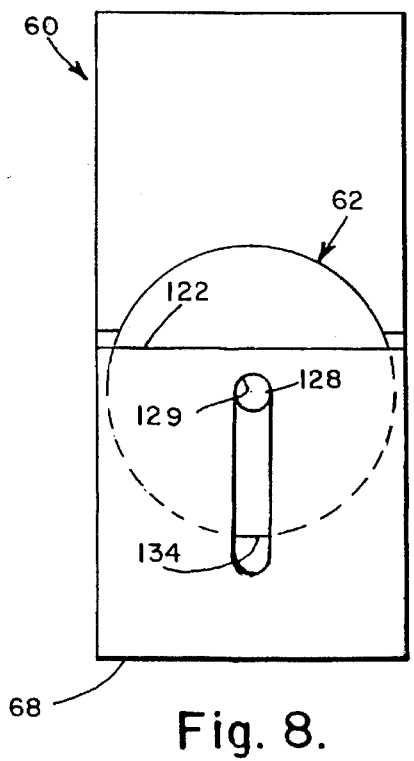

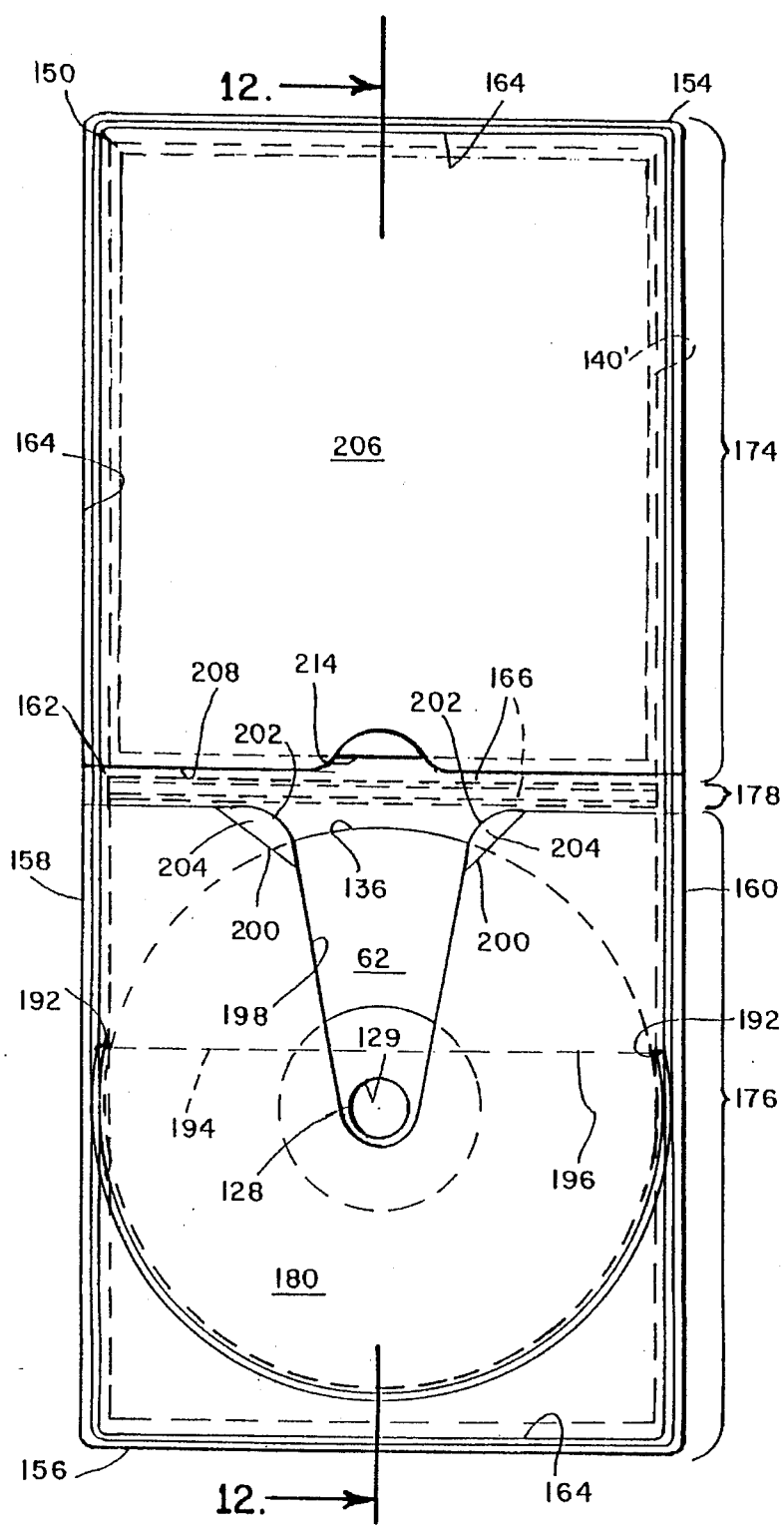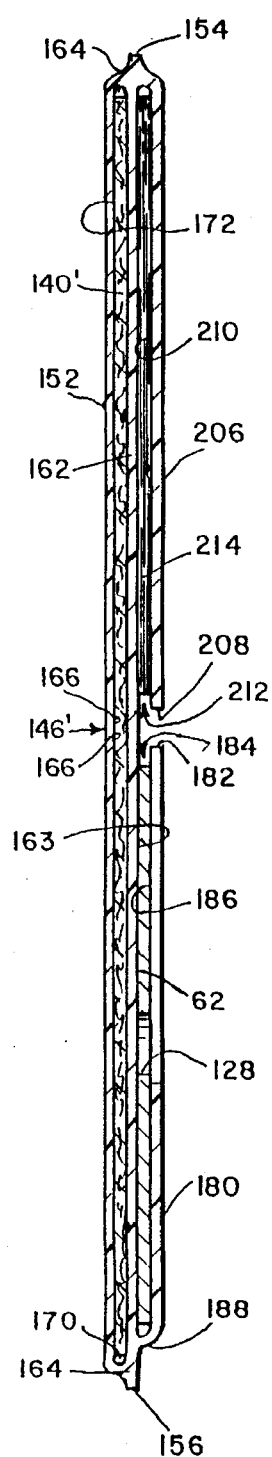

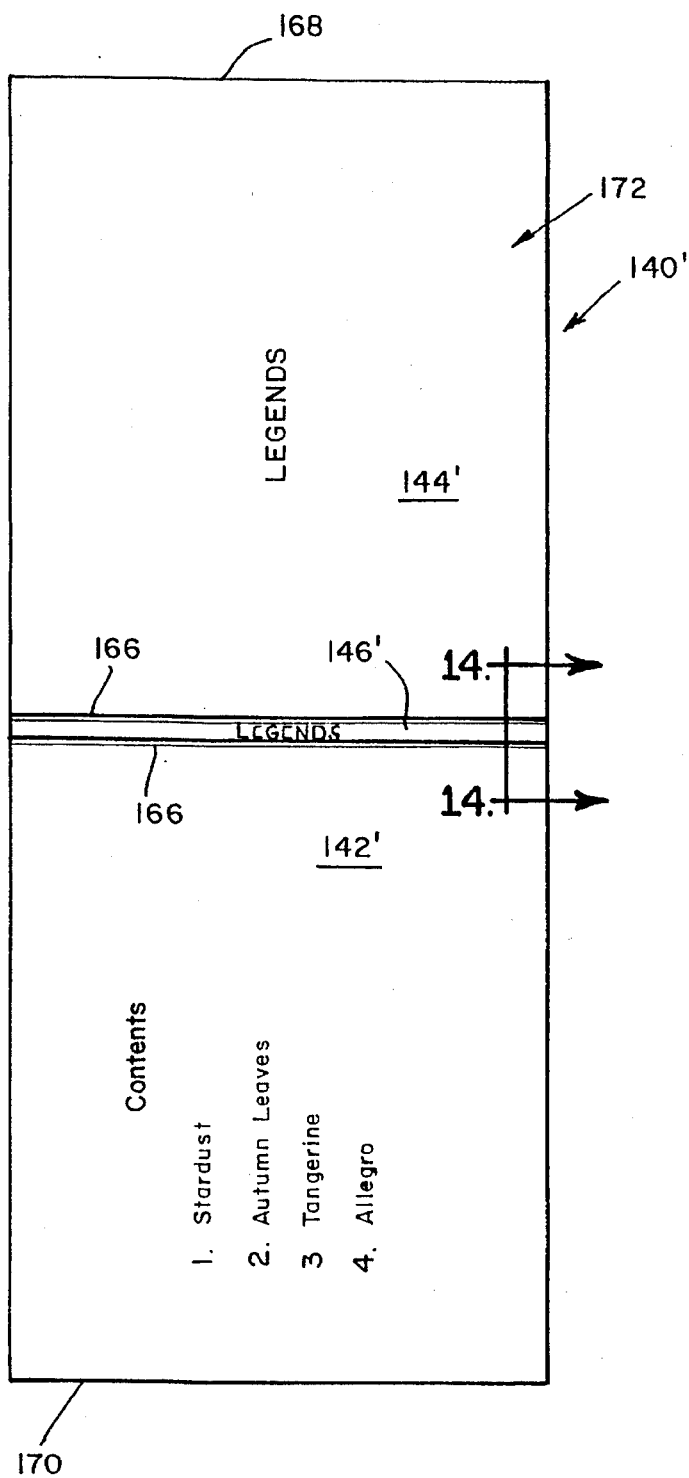
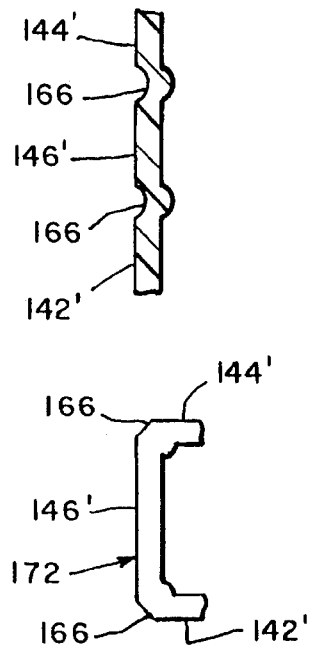
Fig. 13.
Fig. 14.
Fig. 15.

WALLET FOR CONTAINING A COMPACT DISC, AND FABRICATION METHOD

CROSS REFERENCE TO RELATE APPLICATIONS

This application is a continuation-in-part of copending U.S. patent application Ser. No. 08/326,540, filed Oct. 20, 1994, pending which is a continuation-in-part of copending U.S. patent application Ser. No. 08/145,253, filed Oct. 29, 1993, pending and of U.S. patent application Ser. No. 29/014,817, filed Oct. 29, 1993, now U.S. Pat. No. D353, 837, which applications are incorporated herein by reference.

BACKGROUND OF THE INVENTION

This invention relates to devices for protectively storing disks, and more particularly to plastic wallets for containing disks such as optical digitally encoded disks.

As related in the aforementioned parent application Ser. No. 08/145,213, disk inserts have been utilized in cap closures for milk bottles, as well as for other containers for holding liquids such as fruit juices. Such disks are generally constructed of a rigid sheet material such as cardboard, are usually decorated or have a message printed thereon, and have become the subject of collection by many persons. In fact, interest in collecting such disks has increased in recent years to the extent that new disks are being designed for distribution directly to collectors. Regardless of their original purpose, these cardboard disks are commonly known as "milk caps", and are sometimes called "pogs" (which is an acronym for the names of certain fruits sold as juices). The dimensions of such collectible milk caps or pogs are generally substantially identical, regardless of their source, commonly having a diameter of approximately 1 5/8 inches and a thickness of approximately 3/64 inch.

As with any collectible item, the physical condition of milk caps contribute significantly to their desirability and economic value. The proliferation of milk cap collections has resulted in a need for preserving the milk caps' original condition (or at least to decrease their further deterioration), while permitting their storage in an orderly fashion while also permitting the protected milk caps to be conveniently accessible and their printed surfaces to be viewed. The utilization of prior art devices, such as those designed for holding coins, have been unsuccessful in filling this need.

Other disks, such as those having digitally encoded information embedded thereon, also require protective devices for their storage and handling. One type of such disk is the well-known plastic disk having optical digitally encoded information thereon which, in a popular form commonly known as a "compact disc" or "CD", contains digitally encoded audio information thereon for playback by optical transducer means utilizing a laser device. CDs are conventionally individually packaged in a reusable storage device for protecting the CD and its optical information surface.

SUMMARY OF THE INVENTION

The invention disclosed in parent application Ser. No. 08/145,253 provides a device for protectively storing disks, and in particular collectible milk caps or pogs while permitting viewability of such disks, and of course may be utilized for protectively storing disks containing encoded information for playback such as con, pact discs or CDs. Briefly described, the device comprises, in combination, two flexible plastic panels in superposed relation, and securing means securing the panels in such superposed relation with a first opening for receiving the disk between the panels, the securing means including an arcuate seam sealing the superposed panels along a circular arc for containing at least one-half but not the entirety of the disk between the panels within the arc of the seam, the arc of the seam exceeding 180° (and preferably at least approximately 230°) and terminating at a second opening between the superposed panels of sufficient width for permitting passage therethrough and into the arc of at least one-half of the disk when the disk is received by the first opening. The width of the second opening and the inside diameter of the arcuate seam are related to the diameter and the thickness of the disk such that the disk resists withdrawal from within the arc of the seam through the second opening when at least one-half of the disk is contained within the arc.

A preferred embodiment of the device as disclosed in the aforementioned parent application is in the form of an album leaf for containing a plurality of disks, such as milk caps, the album leaf comprising, in combination, a first substantially rectangular flexible plastic panel; a plurality of substantially rectangular second flexible plastic panels; and securing means securing the second panels respectively to the first panel in superposed relation with an edge of each second panel providing a first opening between the first panel and the second panel for receiving the disks, the securing means including a plurality of arcuate seams sealing the second panels to the first panel in such superposed relation, each arcuate seam describing a circular arc for containing at least one-half but not the entirety of a one of the disks between the first panel and a one of the superposed second panels within the arc of the seam, the arc of the seam exceeding 180° (preferably being approximately 230°) and terminating at a second opening between the first panel and the one superposed second panel, the second opening having a width for permitting passage therethrough and into the arc of at least one-half of the one disk when the one disk is received by the first opening between the first panel and the one superposed second panel for containing the entirety of the one disk between the first panel and the one superposed panel. With respect to each of the arcuate seams, the width of the second opening and the inside diameter of the arcuate seam are related to the diameter and thickness of the one disk such that the one disk resists withdrawal from within the arc of the seam through the second opening when at least one-half of the disk is contained within the arc.

When a disk is fully inserted into the device through the first and a second opening, the disk is self-positioning with respect to the arcuate seam and, although only partially contained within the arcuate seam, is preferably completely contained between the two plastic panels. Although the device permits the disk to be easily withdrawn from between the two plastic panels by hand, the device causes resistance to accidental withdrawal of the disk from between the two panels.

Preferred embodiments of the devices embraced in the aforementioned parent application Ser. No. 08/326,540 and in the present application are each in the form of a wallet or holder for containing a disk, and in particular an information disk such as an optical compact disc or CD. A preferred embodiment of the wallet of the parent application comprises a substantially rectangular first flexible plastic sheet foldable to form a front cover and a rear cover separated by a spine; a second flexible plastic sheet in superposed relation with the front cover and welded to the front cover along three edges thereof forming a pocket between the front cover and the second sheet having an opening; and a third flexible plastic sheet and a fourth flexible plastic sheet in superposed relation with one another and with the rear cover and welded to the rear cover along three edges thereof forming a second pocket between the rear cover and the third sheet having an opening, the third and fourth sheets further welded together by an arcuate seam along a circular arc including welds at the termini of the arc exceeding 180° forming a third pocket between the third and fourth sheets having a first opening for receiving the disk, the welds at the termini of the arc defining a second opening of the third pocket for permitting passage therethrough and into the arc of at least one-half but not the entirety of the disk when the disk is received by the first opening. The third sheet preferably includes a fabric surface, such as a non-woven fabric or spun plastic surface, facing the superposed fourth sheet.

The width of the second opening and the diameter of the arc are related to the diameter and thickness of the disk such that the disk resists withdrawal from within the arc through the second opening when at least one-half of the disk is contained within the arc.

For greater protection of the disk, the dimensions of the third and fourth sheets in relation to the disk are such that the disk is substantially entirely contained between the third and fourth sheets when at least one-half of the disk is contained within the arc. The typical CD includes a central aperture and the wallet may include, particularly in embodiments wherein the disk may be substantially entirely contained between the third and fourth sheets, an opening or slot in the fourth sheet for affording manual access to the disk's central aperture for assisting in withdrawal of the disk through the second and first pocket openings of the third pocket. A preferred feature of a CD wallet in accordance with the present invention is the provision of a slot in the fourth sheet longitudinally extending toward the wallet's spine and affording access to the central aperture in the CD when the CD is contained within the third pocket, or when at least one half of the CD is contained within the arc of the third pocket. The slot permits a person to manually urge the CD at the central aperture for displacing a portion of the CD from the third pocket, the slot being sufficiently long for thereupon affording access through the slot to an edge of the CD for displacing the CD's central aperture from the third pocket.

According to another aspect thereof, a wallet is provided for containing a compact disc, comprising a transparent substantially rectangular first flexible plastic sheet, foldable to form a front cover and a rear cover separated by a spine; a substantially rectangular second flexible plastic sheet in superposed relation with the front cover and welded to the front cover along three edges thereof, forming a first pocket between the front cover and the second sheet having an opening facing the spine; a substantially rectangular third flexible plastic sheet and a fourth flexible plastic sheet in superposed relation with one another and with the rear cover and welded to the rear cover along three edges thereof, forming a second pocket between the rear cover and the third sheet having an opening facing the spine, and forming a third pocket between the third and fourth sheets having an opening for receiving the compact disc; and a substantially rectangular graphics sheet contained in the first and second pockets and bridging the spine, the graphics on the graphics sheet being viewable through the first plastic sheet. The third and fourth sheets may be further welded together by an arcuate seam along a circular arc for containing at least one-half of the compact disc when the compact disc is received by the third pocket.

A preferred embodiment of the CD wallet taught in the present application comprises a transparent rectangular first flexible plastic panel and a rectangular second flexible plastic panel of the same dimensions as the first panel, the first and second panels welded together along four edges thereof; a rectangular graphics sheet interposed between the first and second panels and enclosed or entrapped within the welded edges of the welded together first and second panels, the graphics sheet having graphics thereon viewable through the first panel, the welded together first and second panels and the interposed graphics sheet foldable to form a front cover and a rear cover separated by a spine; and a third flexible plastic panel superimposed on one of the covers and facing the second panel, the third panel welded along three edges thereof to three edges of the one cover forming a pocket between the one cover and the third panel having an opening along an unsealed edge of the third panel facing the spine for receiving the compact disc. The wallet further includes a rectangular fourth flexible plastic panel superposed on the other of the covers and facing the second panel, the fourth panel welded along three edges thereof to three edges of such other cover forming a pocket between such other cover and the fourth panel having an opening along an unsealed edge of the fourth panel facing the spine.

The graphics sheet has greater rigidity than the first and the second plastic panels, and the graphics sheet includes two parallel scores along which the welded together first and second panels and the interposed graphics sheet are foldable to define the spine.

The third panel is welded to the second panel along a seam defining the depth in the pocket to which the compact disc may be inserted when received by the pocket opening. This seam is situated along a circular arc having a radius slightly greater than the radius of the compact disc and positioned on the second panel such that the entire disc is contained on the one cover when the disc is contained in the pocket. The arc preferably exceeds 180°, and the seam includes welds at the termini of the arc defining therebetween a second opening of the pocket for permitting passage therethrough and into the arc of at least one-half but not the entirety of the disc when the disc is received by the opening along the third panel's unsealed edge.

The plastic panels are preferably of a polypropylene or other polyolefin sheet material, and the second panel preferably includes a nonwoven fabric bonded to a backing sheet with the backing sheet facing the graphics sheet.

In accordance with an optional feature of the present invention, the unsealed edge of the CD wallet's third panel is configured with a thumb notch extending from rounded corners of the unsealed edge, the rounded corners being folded thereacross to form ears extending away from the second panel for facilitating entry of the compact disc into its pocket.

The present invention further includes a method for fabricating a wallet having a width dimension and a longitudinal dimension for containing a compact disc, comprising: providing a longitudinally extending transparent first flexible plastic web, a longitudinally extending second flexible plastic web and a longitudinally extending third flexible plastic web; providing a rectangular graphics sheet having a longitudinal dimension and a width dimension respectively slightly less than the longitudinal dimension and the width dimension of the wallet being fabricated, the graphics sheet including scores thereon along the sheet's longitudinal dimension to define a spine therebetween substantially midway of the sheet's longitudinal dimension; cutting the third web to form an opening therethrough having two generally obverse edges respectively on opposite sides of a lateral line and spaced therefrom, the opening having a width dimension along the lateral line greater than the width dimension of the wallet being fabricated; superposing the second web on the third web; welding the second and third webs together to form a seam along an arc concavely facing the lateral line, the arc having a diameter slightly greater than the diameter of the compact disc and a center longitudinally spaced from the lateral line by a distance greater than one-half the diameter of the compact disc plus one-half the distance between the scores defining the spine; placing the graphics sheet on the second web with the two parallel scores respectively on opposite sides of the lateral line; superposing the first web on the graphics sheet; welding the first, second and third webs together to form a seam defining a rectangle having a width dimension slightly greater than the diameter of the compact disc and a longitudinal dimension greater than twice the diameter of the compact disc plus the distance between the two scores on the graphics sheet, the longitudinal dimension of the rectangle being bisected by the lateral line and the width dimension of the rectangle being contained within the width dimension of the opening through the third web; and cutting the welded together first, second and third webs along the rectangle including the rectangular seam. After cutting the welded together first, second and third webs, the cut welded together first and second webs and the entrapped graphics sheet are folded along the two parallel scores with the cut first web outwardly disposed.

BRIEF DESCRIPTION OF THE DRAWINGS

The novel features which are believed to be characteristic of the invention, together with further advantages thereof, will be better understood from the following description considered in connection with the accompanying drawings in which preferred embodiments are illustrated by way of example. It is to be expressly understood, however, that the drawings are for the purpose of illustration and description only and are not intended as a definition of the limits of the invention.

FIG. 4 is an elevation view of the inside of a preferred embodiment of a wallet for holding a disk, as taught in parent application Ser. No. 08/326,540, shown in open condition and with a compact disc or CD contained therein;

FIG. 5 is a cross-sectional elevation view of the wallet of FIG. 4, taken along the line 5—5 of FIG. 4 in the direction of the appended arrows; and FIG. 6 is an enlargement of a fragment of the wallet of FIG. 4, the fragment indicated in FIG. 4 as within the dashed enclosure 6;

FIG. 7 is an elevation view of the inside of an alternative embodiment of a wallet for holding a disk or CD;

FIGS. 8 and 9 are elevation views of the inside of the preferred wallet embodiment as in FIG. 4, shown with the CD during removal from the wallet;

FIG. 10 is an elevation view of the outside of the wallet of FIG. 4, shown in open condition and with a graphics sheet contained therein;

FIG. 11 is an elevation view of the inside of a preferred embodiment of a wallet for holding a compact disc according to the present invention, shown in open condition and with a compact disc or CD contained therein;

FIG. 12 is a cross-sectional elevation view of the CD wallet of FIG. 11, taken along the line 12—12 of FIG. 11 in the direction of the appended arrows;

FIG. 13 is an elevation view of a graphics sheet component of the CD wallet of FIG. 12, shown in unfolded condition and with printed graphics thereon;

FIG. 14 is a fragmentary cross-sectional view of the graphics sheet of FIG. 13, taken along the line 14—14 of FIG. 13 in the direction of the appended arrows;

FIG. 15 is the graphic sheet fragment of FIG. 14 shown in folded condition;

DESCRIPTION OF THE PREFERRED EMBODIMENTS

Figure 1:
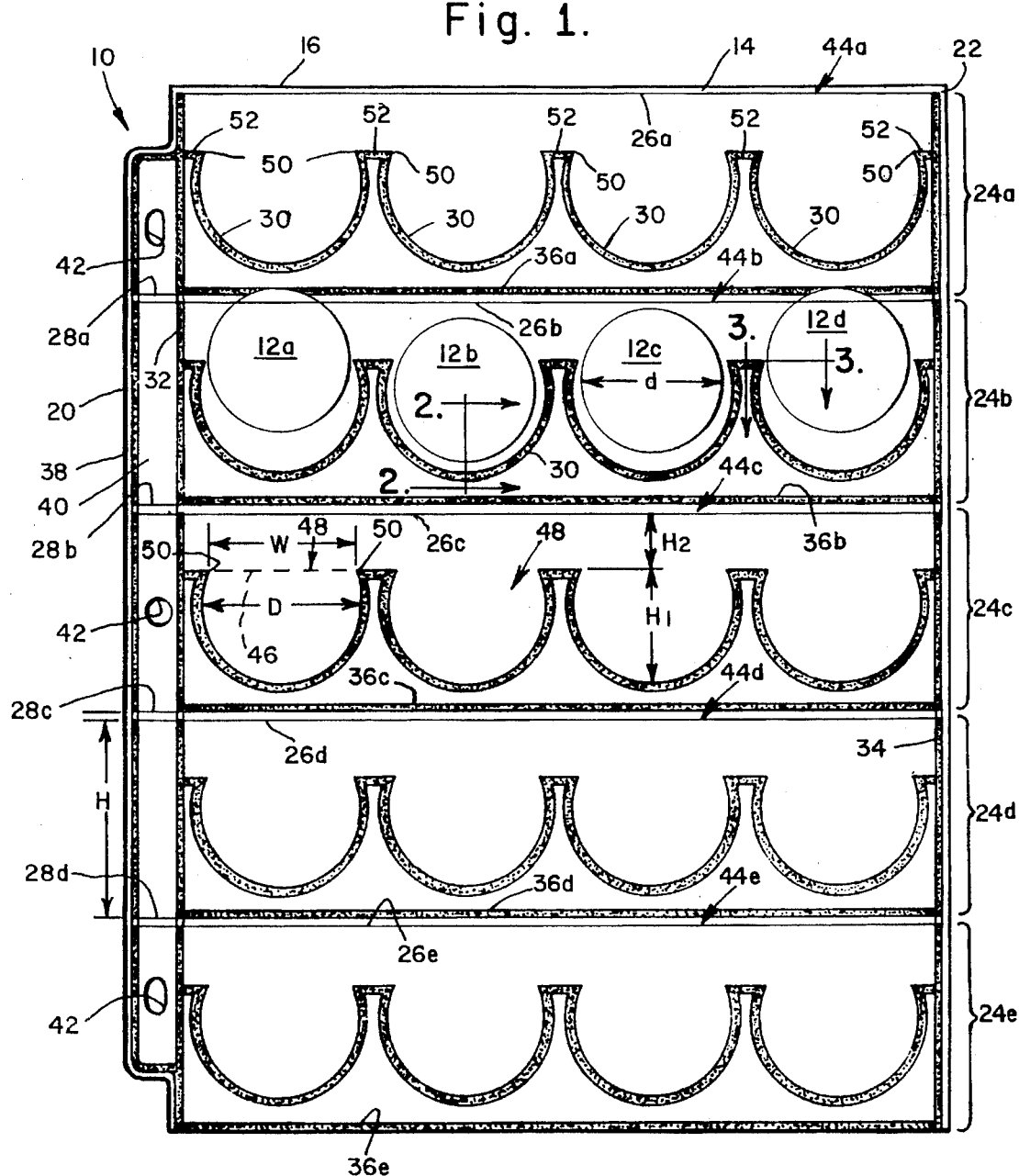
FIG. 1 is a front elevation view of a preferred embodiment of an album leaf, as taught in parent application Ser. No. 08/145,253, shown with a plurality of milk caps for illustrating the manner of use of such album page.
Figure 2:
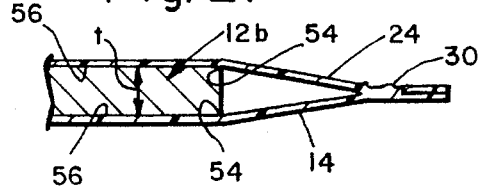
FIG. 2 is a fragmentary cross-sectional view of an arcuate seam of the album leaf of FIG. 1, with a contained milk cap, taken along the line 2—2 of FIG. 1 in the direction of the appended arrows.
Figure 3:
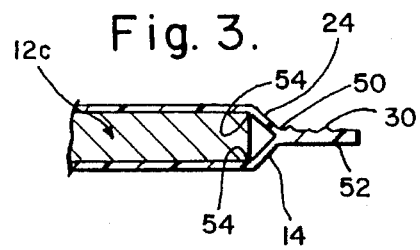
FIG. 3 is a fragmentary cross-sectional view of the album leaf of FIG. 1, at the opening to the arcuate seam during insertion or withdrawal of a milk cap, taken along the line 3—3 of FIG. 1 in the direction of the appended arrows.

Considering FIGS. 1, 2 and 3 together, there is illustrated a preferred embodiment of an album leaf 10 for protectively storing and displaying a plurality of disks 12 and in particular a plurality of milk caps 12, represented by the four disks or milk caps 12a, 12b, 12c, 12d, each having a diameter d and a thickness t. The album leaf 10 includes a substantially rectangular, flexible plastic sheet or panel 14 having an upper edge 16, a lower edge 18, a left edge 20 and a right edge 22, as viewed in FIG. 1. Superposed on the first sheet 14 are five strips 24 or second substantially rectangular, flexible plastic sheets or panels 24a, 24b, 24c, 24d, 24e, each having a height H slightly less than one-fifth the height of the first panel 14, and each having a width substantially equal to the width of the first panel 14. Each of the second panels 24 is directly superposed on the first panel 14, and the second panels 24 are arranged such that their respective left edges are aligned with the left edge 20 of the first panel 14 and their respective right edges are aligned with the right edge 22 of the first panel 14. As viewed in FIG. 1, the uppermost second panel 24a is superposed on the first panel 14 with the upper edge 26a of the second panel 14a parallel to and slightly lower than the upper edge 16 of the first panel 14; the upper edge 26b of the second panel 24b is parallel to and slightly lower than the lower edge of the uppermost second panel 24a; the upper edge 26c of the second panel 24c is parallel to and slightly lower than the lower edge 28b of the second panel 24b; the upper edge 26d of the second panel 24d is parallel to and slightly lower than the lower edge 28c of the second panel 24c; and the upper edge 26e of the lowermost second panel 24e is parallel to and slightly lower than the lower edge 28e of the lowermost second panel 24e being aligned with the lower edge 18 of the first panel 14.

The second panels 24 are each secured to the first panel 14 in superposed relation, arranged as described above, by means at least of a plurality of arcuate seams 30. Preferably, the panels 14, 24 are further secured together in such relation by a seam pattern which includes, as viewed in FIG. 1, a left vertical seam 32 and a right vertical seam 34 extending from the leaf's upper edge 16 to its lower edge 18, horizontal seams 36a, 36b, 36c, 36d, 36e, extending between the vertical seams 32, 34 and along the lower edges 28a, 28b, 28c, 28d, 28e of the respective second panels 24a, 24b, 24c, 24d, 24e. A seam 38 is preferably provided along the leaf's left edge 20, for providing a tab or margin 40 in which apertures 42 may be cut for permitting the leaf 10 to be retained by correspondingly positioned rings of a loose-leaf binder or album.

The first and second panels 14, 24 are preferably of a thermoplastic sheet material, i.e. a plastic sheet material which is susceptible to thermo-adhesive welding techniques for securing the superposed panels 14, 24 by means of the seams 30, 32, 34, 36, 38 having been formed by thermocontact or radio-frequency welding techniques. One example of such thermoplastic sheet material is polyvinyl chloride, or vinyl, whereby the seams sealing the panels together may be produced by well known radio-frequency welding techniques. A preferred example of a thermoplastic sheet material is a polyolefin such as polypropylene, which material is substantially chemically inert so as not to react with dyes and other surface components of milk caps, and is physically resistant to extreme heat and cold. Utilizing polypropylene sheet material for the first and second panels 14 and 24, the seams 30, 32, 34, 36, 38 my be produced by thermocontact welding techniques such as taught by U.S. Pat. No. 5,312,507 of William R. Miller, titled "Thermocontact Welding Method and Welded Product", which patent is incorporated herein by this reference. In one suitable example of the album leaf 10, the thickness of each of the polypropylene panels 14, 24a, 24b, 24c, 24d, 24e was approximately 120 microns, although flexible sheets of other thermoplastic materials and/or having other thicknesses may be employed. Further, it is preferred that either the first panel 14 or the second panels 24 be transparent, or alternatively that both the first panel 14 and the second panels 24 be transparent, so that at least one surface of each of the milk caps 12 may be viewed when contained between the panels 14, 24 of the album leaf 10.

The second panels 24a, 24b, 24c, 24d, 24e are secured to the first panel 14 such that the respective upper edges 26a, 26b, 26c, 26d, 26e of the second panels 24 between the vertical seams 32, 34 are unsealed, providing respective openings 44a, 44b, 44c, 44d, 44e between the first panel 14 and the respective second panels 24 for receiving the disks 12 between the first panel 14 and a second panel 24, for example as illustrated by the disk 12a shown in FIG. 1.

The arcuate seams 30 sealing a second panel 24 to the first panel 14 are horizontally arranged along the second panel 24. Each arcuate seam 30 describes a circular arc for containing at least one-half (preferably more than one-half) but not the entirety of a disk 12 between the superposed panels 14, 24, within the arc of the arcuate seam 30. The arc of each of the arcuate seams 30 exceeds 180° and terminates at a horizontal chord 46 (shown in phantom in FIG. 1), i.e. the chord 46 being substantially parallel to the second panel's upper edge 26. The termination of the arcuate seam 30 (i.e. at the chord 46) provides each arcuate seam 30 with a second opening 48 between the superposed panels 14, 24 of sufficient width W (i.e. between the arcuate seam's termini 50) for permitting passage through the second opening 48 and into the arc of a seam 30 of at least one-half (and preferably more than one-half) of a disk 12 when the disk 12 is received by the first opening 26, for example as illustrated by the disks 12a and 12b in FIG. 1. The height H of each of the second panels 24 is sufficiently great that the entirety of the disk 12 is contained between the superposed panels 14, 24 when the disk 12 is normally situated within the arc of the seam 30, as illustrated by the disks 12b and 12c of FIG. 1.

The arcuate seams 30 preferably terminate with reinforcing welds such as the horizontal seams 52 which, if situated between adjacent arcuate seams 30, may connect adjacent termini 50 thereof.

The inside diameter D of each arcuate seam 30 is slightly greater than the diameter d of a disk or milk cap 12. When a milk cap 12 has been inserted into an arcuate seam 30 between the first panel 14 and a second panel 24 and then released by the person inserting the milk cap, the milk cap 12 is automatically positioned concentrically within the arcuate seam 30, as illustrated by the milk cap 12b in FIG. 1. Such self-positioning of the milk cap 12 appears to be in reaction to forces exerted by the somewhat elastic first and second panels 14, 24, upon the circumferential intersections 54 of the milk cap's respective sides 56 with its edge 58 as the two panels 14, 24 inwardly of the arcuate seam 30 are forced apart in consequence of the thickness t of the inserted disk 12, as illustrated in FIG. 2.

The width W of each arcuate seam opening 48 (i.e., the length of the chord 46) and the inside diameter D of an arcuate seam 30 are related to the diameter d and thickness t of a disk or milk cap 12 such that the milk cap 12 resists withdrawal from within the arcuate seam 30 through the second opening 48 when at least one-half of the milk cap 12 is contained within the arc of the seam 30. For examples of the preferred embodiment of the album leaf 10 described herein, it has been observed that a milk cap 12 which has been received by an arcuate seam 30 (see milk cap 12b of FIG. 1) resists withdrawal from within the arc even when the leaf 10 is turned upside-down and vigorously shaken, in which event the milk cap 12 became situated within the arcuate seam 30 as represented by the milk cap 12c of FIG. 1, remaining entirely contained between the first and second panels When a milk cap 12 is to be intentionally removed from between the panels 14, 24 of the leaf 10, such as when a milk cap 12 is grasped by a person's fingers and outwardly urged (upwardly as viewed in FIG. 1) for being withdrawn as represented by the milk cap 12d of FIG. 1, the milk cap's position of greatest resistance to withdrawal is when its diameter d is aligned with the chord 46 for passage through the second opening 48. This condition is represented in greater detail in FIG. 3, wherein it may be appreciated that the magnitude of the forces exerted upon the circumferential intersections 54 of the milk cap's respective sides 56 with its edge 58—in consequence of the thickness t of the milk cap 12c and the elasticity of the panels 14, 24 inwardly of the arcuate seam's termini 50—is at a maximum. The magnitude of such drag forces when the disk is in its normal position within the arcuate seam 30 and entirely between the first and second panels 14, 24, as represented by milk caps 12b and 12c in FIG. 1, is of course less than the maximum forces exerted during intentional withdrawal. Nevertheless, the dimensions of the width W of the second opening 48 and the inside diameter D of the arcuate seam 30 in relation to the diameter d and thickness t of the milk cap 12, present forces which are sufficient for normally maintaining the milk cap 12 entirely contained between the first panel 14 and a second panel and for causing the milk cap 12 to resist withdrawal through the second opening 48, when at least one-half of the milk cap is contained within the arc of the arcuate seam 30.

It is thought that other forces resulting from the relationships discussed above may be involved in causing the disk to resist withdrawal from within the arcuate seam 30, such as drag forces provided by surface contact between the panels 14, 24, and the two sides 56 of the milk cap 12, and perhaps by a tendency for air pressure within the arc of the arcuate seam 30 to decrease, as the milk cap 12 is outwardly urged from its normal position within the arc of the seam 30.

In one suitable example of an album leaf 10 fabricated of transparent 120 micron polypropylene panels 14, 24 for containing milk caps 12 of 1 5/8 inch diameter d and 3/64 inch thickness t, each second panel 24 had a width between vertical seams 32, 34 of approximately 8¼ inches and a height H of approximately 2⅛ inches, and the second panels 24 were superposed on the first panel 14 with a vertical separation between respective edges 28, 26 of vertically adjacent second panels 24 of approximately ⅛ inch. The 2⅛ inch height H of a second panel 24 allowed for a vertical or perpendicular distance of approximately ⅝ inch between the chord 46 and the second panel's upper edge 26, although it was observed for this album leaf example that this perpendicular distance could be reduced to approximately ½ inch with satisfactory results. The arc of each arcuate seam 30 was approximately 230°, the inside diameter D of the arc of each arcuate seam 30 was approximately 1 13/16 inches, and the width W of the second opening 48 or chord 46 (between the termini 50 of an arcuate seam 30) was approximately 1 11/16 inches.

It may be observed for this example of the preferred album page 10, that the width W of the second opening 48 was greater than the diameter d of a milk cap 12 by a distance of approximately 4/3 times the thickness t of the milk cap 12, although it would appear that satisfactory results would be achieved for widths W of the second opening 48 greater than the diameter d of a milk cap 12 and through a range exceeding 4/3 the thickness t. It may be similarly observed that the difference between the inside diameter D of the arc of an arcuate seam 30 and the diameter d of a milk cap 12 was approximately four times the thickness t of the milk cap 12.

Turning to FIGS. 4, 5 and 6, there is shown a preferred embodiment of a wallet 60 for protectively storing a disk such as an optical digitally encoded compact disc or CD 62 (shown in phantom). The CD wallet 60 includes a substantially rectangular first flexible plastic panel or sheet 64 having an upper edge 66, a lower edge 68, a left edge 70 and a right edge 72, as viewed in the drawing of FIG. 4. The rectangular first sheet 64 is preferably of a thermoplastic sheet material, preferably a polyolefin such as polypropylene, and is foldable along two parallel fold lines or creases which may be implemented by respective bar seals 74, 76 produced by an appropriate thermoplastic welding process. The bar seals 74, 76 are parallel to the upper and lower edges 66, 68 of the rectangular first sheet 64 and are situated along the sheet 64 to form a spine 78 therebetween and midway between the upper and lower edges 66, 68. When the rectangular first sheet 64 is folded along the bar seals 74, 76, the first sheet 64 comprises a front cover 80 and a rear cover 82 separated by the spine 78.

A second flexible plastic panel or sheet 84, preferably rectangular and substantially of the same dimensions as the front cover 80, is in superposed relation with the front cover 80, and is welded along three of its edges to the inner surface of the front cover 80 by means of welded edge seams 86. The fourth edge 88 of the second sheet 84 remains unsealed, resulting in a first pocket 90 between the front cover 80 and the second sheet 84 having an opening 92 preferably adjacent and parallel to or otherwise facing the spine 78.

A third flexible plastic panel or sheet 94 is in superposed relation with a fourth flexible plastic panel or sheet 96. The third and fourth sheets 94, 96 are preferably substantially rectangular and are of substantially the same width (i.e. the horizontal dimension as viewed in the drawing of FIG. 4) as the width of the rear cover 82 and slightly wider than the diameter of the disk 62. The third sheet 94 is preferably of a thermoplastic laminate material having a spun or nonwoven fabric surface, such as one ounce spun or nonwoven polypropylene fabric laminated to a 60 micron polypropylene backing sheet. The fourth sheet 96 is of a thermoplastic sheet material, preferably a polyolefin such as polypropylene.

The superposed third and fourth sheets 94, 96, with the spun or fabric surface of the third sheet 94 facing the fourth sheet 96, are welded together by an arcuate seam 98 along a circular arc 100. The circular arc 100 exceeds 180° and terminates at termini 102 at each end of a horizontal chord 104 (as viewed in the drawing of FIG. 4 and shown in phantom therein). As with the configuration of the arcuate seam 30 discussed above in connection with FIG. 1, the weld of the arcuate seam 98 in FIG. 4 may continue along the circular arc 100 until reaching the arc's termini 102 so that the welds at the termini 102 of the arc 100 represent the termini of an arcuate seam which is continuous throughout the circular arc 100. It is preferred, however, that when welding together the third and fourth sheets 94, 96, there is a break or discontinuity in the arcuate seam 98 as the arc 100 approaches parallelism with a vertical edge 106 of the superposed third and fourth sheets 94, 96. In this case the welds at the termini 102 of the circular arc 100 may be spot welds 108, the inner boundaries of which are along the circular arc 100 at the termini 102.

The weld of the arcuate seam 98 may be discontinuous at other places along the circular arc 100. For example, as shown in FIG. 7, the arcuate seam 98 may include two end segments 98a terminating at the respective termini 102 of the circular arc 100, and may also include a third seam segment 98b centrally positioned between the wallet's left and right edges 70, 72 (as viewed in the drawing of FIG. 7) and along the circular arc 100. The welds at the termini 102 of the circular arc 100 are represented by the uppermost (as viewed in the drawing of FIG. 7) ends of the seams 98a, respectively, at each end of the chord 104.

Returning to FIGS. 4–6, the superposed third and fourth sheets 94, 96, which have been welded together along the circular arc 100 as just described, are further welded to the inner surface of the rear cover 82 along three edges thereof by means of the welded edge seams 86. A fourth edge 110 of the third sheet 94 remains unsealed and is preferably adjacent and parallel to the spine 78, defining a pocket opening 112 of a second pocket 114 formed between the rear cover 82 and the third sheet 94 by the welded edge seams 86. The arcuate seam 98 between the third and fourth sheets 94, 96, as continued by the two vertical welded edge seams 86 upwardly thereof (i.e. upwardly from the ends 116 of the previously formed arcuate seam 98) defines a third pocket 120 having a first opening 122 along the unsealed fourth edges 110, 124 of the third and fourth sheets 94, 96.

The welds 108 at the termini 102 of the circular arc 100 along which the arcuate seam 98 extends, defines a second opening 126 between the superposed third and fourth sheets 94, 96 of sufficient width (as represented by the chord 104) for permitting passage through the second opening 126 and into the arc 100 of at least one-half (and preferably more than one-half) of the disk 62 when the disk 62 is received by the first opening 122. When the CD 62 is inserted in the pocket 120 (as shown in FIGS. 4 and 5), the CD 62 is oriented such that its optical digitally encoded surface faces the third sheet 94, while the CD's other side (which is typically imprinted with identifying and decorative indicia) faces the fourth sheet 96 which is preferably transparent for viewing the CD's printed surface. The height (i.e. the vertical dimension as viewed in the drawing of FIGS. 4 and 5) of the third sheet 94 is preferably sufficiently great for assuring that at least the digitally encoded surface of the CD 62 engages the spun or non-woven surface of the third sheet 94 when the CD 62 is contained within the pocket 120. For greater protection of the CD 62, it is preferred that the height of the fourth sheet 96 is sufficiently great that substantially the entirety of the disk is contained between the third and fourth superposed sheets 94, 96 when at least one-half of the CD 62 is received by the second opening 126.

The diameter of the circular arc 100, and accordingly the inside diameter of the arcuate seam 98, is slightly greater than the diameter of the disk 62. It may be appreciated that the manner in which the disk 62 may be inserted and withdrawn from the pocket 120, and the characteristics and relationships thereof, are as previously disclosed herein in FIGS. 1–3 and the corresponding discussion in connection with the album page 10. The width of the second opening 126 of the pocket 120 and the inside diameter of the arcuate seam 98 are related to the diameter and thickness of the disk 62 such that the disk resists withdrawal from within the seam 98 through the second opening 126 when at least one-half of the disk 62 is received by the second opening 126 for being contained within the arc 100. The width of the second opening 126 is greater than the diameter of the disk 62 by a distance for increasing drag force on the disk 62 when the disk 62 is outwardly urged from the CD pocket 120 (i.e. upwardly urged as viewed in the drawing of FIGS. 4 and 5) while at least one-half of the disk is contained within the arc 100.

A typical audio CD includes a central aperture 128, and an opening 130 may be provided in the fourth sheet 96 of the CD wallet 60 to afford access by a person through the fourth sheet 96 to the CD 62 at its central aperture 128 when the CD 62 is contained in the pocket 120. The opening 130 illustrated in FIGS. 4 and 5 is in the configuration of a slot 130 exposing a portion of the CD 62 in the vicinity of its aperture 128 and longitudinally extending toward the wallet's spine 78 and the first opening 122 of the pocket 120. The width of the slot 130 is at least as great as the diameter of the CD aperture 128. When it is desired to withdraw the CD 62 from the pocket 120, a person may reach through the slot 130 with his or her finger or thumb and engage the CD 62 at an annular edge 129 or circumference of the aperture 128. In this manner, the CD 62 may be urged outwardly (i.e. upwardly as viewed in the drawing of FIGS. 4 and 5) for displacing a substantial portion of the CD 62 (e.g. the upper approximately 1⅞ inches to 2 inches along the CD's vertical diameter, or approximately the upper 40% of such vertical diameter, as viewed in the drawing of FIG. 8) through the CD pocket's first opening 122, and for displacing the CD's horizontal diameter through the pocket's second opening 126. This condition is illustrated in FIG. 8, and the slot's upper edge 138 (as viewed in the drawing of FIGS. 4 and 8) is in sufficient proximity to the pocket opening 122 (e.g. approximately ⅛ inch to ¼ inch) such that the CD portion extending from the CD pocket opening 122 is sufficiently great to permit ready entry of the CD 62 (directly from the wallet 60) into a typical front-loading CD player when the wallet's front cover 80 is reversely folded at the spine 78.

Although the lower edge 139 slot 130 need barely expose the CD's central aperture 128, in the configuration shown in FIGS. 4 and 5 the slot 130 longitudinally (perpendicularly to the spine seals 74, 76) extends both above and below the CD aperture 128 sufficiently to permit a person to urge the annular edge 129 of the CD 62 for displacing a substantial portion of the CD 62 through the first opening 122 of the CD pocket 120, to the extent that a circumferential edge portion 134 of the CD 62 facing the wallet's lower edge 68 is exposed through the slot 130 as shown in FIG. 8. The person may thereupon reach through the slot 130 and urge the exposed circumferential edge portion 134 outwardly (i.e. upwardly as viewed in the drawing of FIG. 8) for further displacing the CD 62 through the first opening 122 until at least a portion of the CD aperture 128 is outside the CD pocket 120, as illustrated in FIG. 9. Such further displacement of the CD 62 from the pocket 120 not only permits ready entry of the CD 62 (directly from the wallet 60) into a typical front-loading CD player, but alternatively permits the person to grasp the CD 62 at its aperture 128 (i.e. at the annular edge 129) and the CD's circumferential or outer edge 136 for completely removing the CD 62 from its pocket 120. It is noted that the slot's upper edge 138 acts as a stop for the persons finger to stop the outward displacement of the CD 62 from the pocket 120 until the CD 62 is further displaced by the person's outward urging of the CD lower circumferential edge portion 134.

The first pocket 90 between the front cover 80 and the second sheet 84, as well as the second pocket 114 between the rear cover 82 and the third sheet 94, may be utilized to contain documents having decorative and program graphics thereon relating to the information embedded in the particular CD 62 to be carried by the wallet 60. The positions of the pocket openings 92, 112 on opposite sides of the wallet spine 78 permit such graphics to be designed as a single sheet, if desired, for being contained in both pockets 90, 114 and extending between the wallet's upper and lower edges 66, 68 and folded along the spine 78. This feature of the wallet 60 is illustrated in FIG. 10, it being understood that the wallet 60 as shown in FIG. 10 is turned 90° from its orientation as shogun in FIG. 4, in the plane of the drawing; in FIG. 10, the outside surface of the wallet 60 is shown with the single rectangular sheet of graphics 140 viewable through the transparent first plastic sheet 64 with the front cover 80 and rear cover 82 on either side of the vertically shown spine 78. The graphics sheet 140 may include a title section 142 (having graphics thereon identifying the title or audio program of the CD) contained in the first pocket 90 with its graphics viewable through the transparent front cover 80; a contents section 144 (having graphics thereon for identifying the contents of or each selection included in the CD program) contained in the second pocket 114 with its graphics viewable through the transparent rear cover 82; and a spine section 146 between the title and contents sections 142, 144 (typically having title graphics thereon and folded for corresponding with the bar seals 74, 76 of the first plastic sheet 64 and bridging the spine 78) with its graphics viewable through the wallet's transparent spine 78. The graphics sheet 140 may be inserted in the pockets 90, 114 through their pocket openings 92, 112. Alternatively, the graphics sheet 140 may be contained in the pockets 90, 114 as a result of another operation such as by superposing the graphics sheet 140 on the first plastic sheet 64 during the seam welding operation so that the graphics sheet 140 is contained in the pockets 90, 114 as such pockets are being formed. When the wallet 60 is closed by pivoting the front and rear covers 80, 82 from the spine 78, the second and fourth plastic sheets 84, 96 face each other while the graphics on the graphics sheet 140 are viewable from the outside of the closed wallet 60. Further program materials, for example in the form of a booklet (not shown), may be inserted in either of the two pockets 90, 114; if such further program materials were inserted in the first or front cover pocket 90, between the reverse side of the title section 142 of the graphics sheet 140 and the second plastic sheet 84, the second sheet 84 preferably would be transparent so that the graphics on an outer leaf of such further materials may be viewed therethrough when the wallet 60 is in its open condition.

In one suitable example of a CD wallet 60 fabricated of transparent 250 micron polypropylene first, second and fourth sheets 64, 84, 96, and a third sheet 94 of one-ounce spun polypropylene laminated to a 60 micron polypropylene backing, for containing a CD 62 of nominally 120 millimeter diameter (approximately 4.724 inches) and 0.050 inch thickness, and having a central aperture 128 of nominally ⅝ inch diameter, the wallet's front and rear covers 80, 82 were each approximately 5 inches square with a spine 78 of approximately ⅛ inch wide. The width of the welded seams 86, 98 was approximately ³⁄₆₄ inch, and each terminal spot weld 108 was approximately ¹⁄₃₂ inch in width with the mid-point of its approximately ⅛ inch height situated approximately ⁷⁄₁₆ above the horizontal diameter 132 of the arc 100. The height and width of each of the three pockets 90, 114, 120 were approximately 4²⁷⁄₃₂ inches. The circular arc 100 (to the vertical midpoint of the inside boundary of each spot weld 108) was approximately 200°, the inside diameter of the arcuate seam 98 (i.e. the diameter of the circular arc 100) was approximately 4.844 inches, the width of the CD pocket second opening 126 (or chord 104) was approximately 4²⁵⁄₃₂ inches (approximately 4.781 inches), and the width of the CD pocket first opening 122 was approximately 4²⁷⁄₃₂ inches (approximately 4.844 inches). Where a slot opening 130 is included through the fourth sheet 96 in accordance with the configuration shown in FIG. 4, such slot 130 may be approximately ¾ inch in width by approximately 2½ to 3 inches in length, with the slot's upper edge 138 approximately ¼ inch distant from the unsealed edge 124 of the fourth sheet 96.

Turning to FIGS. 11 and 12, there is shown a preferred embodiment of an improved wallet 150 for protectively storing a disk such as the optical digitally encoded compact disc or CD 62. The CD wallet 150 includes a transparent, substantially rectangular first flexible plastic sheet or panel 152 having an upper edge 154, a lower edge 156, a left edge 158 and a right edge 160, as viewed in the drawing of FIG. 11, which edges also define the respective edges of the CD wallet 150. The first panel 152 and the CD wallet 150 each have a longitudinal dimension extending between the lower and upper edges 156, 154 (i.e. the vertical dimension as viewed in the drawing of FIG. 11), and a width dimension extending between the left and right edges 158, 160 (i.e. the horizontal dimension as viewed in the drawing of FIG. 11). The first panel 152 is of a thermoplastic sheet material, preferably a polyolefin such as polypropylene.

A substantially rectangular second flexible plastic sheet or panel 162 has substantially the same longitudinal and width dimensions as the first plastic panel 152. The first and second plastic panels 152, 162 are welded to each other along their respective four edges, by means of the welded edge seam 164 extending along the edges 154, 158, 156, 160 of both the first and second panels 152, 162.

The second panel 162 is of a thermoplastic sheet material, preferably a polyolefin such as polypropylene, which my be transparent but is preferably opaque. Preferably, the second panel 162 is a thermoplastic composite material constructed of a spun or nonwoven polypropylene fabric laminated to a cast polypropylene sheet, such as a one ounce spun or nonwoven polypropylene fabric laminated to a 60 micron polypropylene backing sheet. The first and second panels 152, 162 are welded together with the nonwoven fabric (i.e. the nonwoven fabric surface 163 of the composite second plastic panel 162) facing away from the first plastic panel 152. If the second sheet 162 were to comprise a plastic sheet without the nonwoven material, the second panel 162 would preferably be opaque and have an embossed surface facing away from the first flexible plastic panel 152.

A graphics sheet 140' is interposed between the first and second plastic panels 152, 162 and entrapped or enclosed within the seamed edges 154, 156, 158, 160 of the welded together first and second plastic panels 152, 162. The graphics sheet 140', shown in FIG. 13, corresponds to the graphics sheet 140 previously discussed and shown in FIG. 10; components in FIG. 13 corresponding to similar components in FIG. 10 are indicated by primed reference numerals. The rectangular graphics sheet 140' includes a longitudinal dimension (i.e. the vertical dimension as viewed in the drawing of FIGS. 11, 12 and 13) slightly less than the longitudinal dimension of the first and second plastic panels 152, 162, and a width dimension (i.e. the horizontal dimension as viewed in the drawing of FIGS. 11 and 13) slightly less than the width dimension of the first and second panels 152, 162, such that the interposed graphics sheet 140' fits within and extends nearly to edge seam 164 sealing the edges 154, 156, 158, 160 of the first and second panels 152, 162. The graphics sheet 140' is typically of a paper or paperboard material, and is preferably of greater rigidity than the first plastic panel 152 and the second plastic panel 162; preferably, the rigidity of the graphics sheet 140' is greater than the rigidity of the superposed first and second panels 152, 162. In one suitable example of a CD wallet 150, the graphics sheet 140' was 12 point chip SBS paperboard, the first plastic panel 152 was a 115 micron high clarity polypropylene sheet material, and the second plastic panel was a composite material of one ounce spun or nonwoven polypropylene laminated to a 60 micron polypropylene backing as earlier described.

The orientation of the paperboard graphics sheet 140' is such that the width dimension of the graphics sheet 140' is along or parallel to the paperboard's grain direction. The graphics sheet 140' includes two parallel scored lines or scores 166 thereon along the graphic sheet's width dimension, these scores being spaced from one another for forming a spine section 146' therebetween when the graphics sheet 140' is folded along the scores 166, the spine section 146' being approximately midway of the sheet's longitudinal dimension (i.e. midway between the upper edge 168 and the lower edge 170 of the graphics sheet as viewed in the drawing of FIG. 13). The scores 166 are formed by methods well known in the paper processing art, and typically have an impressed concave profile as shown in FIG. 14. The concave profiles of the scores 166 are along the side or surface 172 of the graphics sheet 140' on which the graphic indicia or graphics are printed, and the graphic sheet's printed surface 172 faces the transparent first plastic panel 152.

When the title section 142' and the contents section 144' of the entrapped graphics sheet 140' are pivoted along the scores 166 as shown in FIG. 15, the first and second flexible plastic panels 152, 162 follow the more rigid graphics sheet 140' and bend or fold along the graphic sheet's scores 166, such that the welded together panels 152, 162 with entrapped graphics sheet 140' comprise a front cover 174 and a rear cover 176 separated by a spine 178 coextensive with the graphics sheet spine section 146', with the graphics on the printed surface 172 of the graphics sheet 140, being viewable through the outwardly disposed transparent first plastic panel 152.

A third flexible plastic sheet or panel 180 is superposed on the rear cover 176, the third panel 180 facing the nonwoven fabric surface 163 of the second panel 162. The width dimension of the third panel 180 is substantially the same as the width dimension of the first and second panels 152, 162, and the longitudinal dimension of the third panel 180 (i.e. the vertical dimension as viewed in the drawing of FIG. 11) is less than the longitudinal dimension of the rear cover 176. As shown in FIGS. 11 and 12, the third panel 180 is welded along three edges thereof to the rear cover 176, along the wallet's left, lower and right edges 158, 156, 160, by means of the welded edge seam 164. A fourth edge 182 of the third panel 180 remains unsealed, defining an opening 184 of a pocket 186 between the rear cover 176 and the third panel 180 for receiving the compact disc 62.

The third panel 180 is further welded to the second panel 162 (but not to the first panel 152) by means of a seam 188 defining the longitudinal depth of the pocket 186 to which the CD 62 may be inserted when received by the pocket opening 184. The seam 188 is situated along a circular arc 190 which has a diameter slightly greater than the diameter of the CD 62, and the seam 188 is longitudinally positioned on the second panel 162 such that the entire CD 62 is contained on the inner surface of the rear cover 176 when the CD 62 is contained in the pocket 186. The seam 188 may take the form of a discrete weld (situated, for example, at the lower-most position along the arc 190, such as the arc segment 98b shown in FIG. 7 or a spot weld. It is preferred, however, that the seam 188 is an arcuate seam extending along the circular arc 190. The circular arc 190 preferably exceeds 180 degrees, terminating at termini 192 at each end of a horizontal chord 194 (as viewed in the drawing of FIG. 11 and shown in phantom therein). As with the configuration of the arcuate seam 30 discussed above in connection with FIG. 1, the weld of the arcuate seam 188 in FIG. 11 continues along the circular arc 190 until reaching the arc's termini 192. Or, as described in connection with FIG. 4, the seam 188 may be discontinuous and the welds at the termini 192 may be spot welds similar to the spot welds 108 of FIGS. 4 and 6. Further, the welded seam 188 may be discontinuous at other places along the circular arc 190, similar to the seam segments 98a, 98b, 98c of FIG. 7.

In the preferred embodiment of the CD wallet 150 shown in FIG. 11, the termini 192 of the circular arc 190 along which the seam 188 extends, defines a second opening 196 between the superposed second and third panels 162, 180 of sufficient width (as represented by the chord 194) for permitting passage through the second opening 196 and into the arc 190 of at least one-half (and preferably more than one-half) of the CD 62 when the CD is received by the first opening 184. When the CD 62 is inserted in the pocket 186 (as shown in FIGS. 11 and 12), the CD 62 is oriented such that its optical digitally encoded surface faces the second panel 162, engaging the nonwoven fabric surface 163 of the second panel 162, while the CD's printed surface faces the third panel 180 which is preferably transparent for viewing the CD's printed surface when the CD wallet 150 is in its open condition. For increased protection of the CD 62, it is preferred that the longitudinal dimension of the third panel 180 is sufficiently great that substantially the entirety of the CD 62 is contained in the pocket 186 when at least one-half of the CD 62 is received by the opening 196, such as is shown in FIG. 11.

From the previous discussion with respect to the characteristics and relationships of the CD wallet 60 of FIG. 4, it may be appreciated that, with respect to the CD wallet 150 shown in FIG. 11, the width of the second opening 196 of the CD pocket 186 and the inside diameter of the arcuate seam 188 are related to the diameter and thickness of the CD 62 such that the CD 62 resists withdrawal from within the seam 188 through the second opening 184 when at least one-half of the CD 62 is received by the second opening 196 for being contained within the arc 190. The width of the second opening 196 is greater than the diameter of the CD 62 by a distance for increasing drag force on the CD 62 when the CD is outwardly urged from the CD pocket 186 (i.e. upwardly urged as viewed in the drawing of FIGS. 11 and 12) while at least one-half of the CD 62 is contained within the arc 190.

The unsealed edge 182 of the third panel 180 is configured with a thumb notch 198 extending to just below the position of the CD's central aperture 128 when the CD is contained in its pocket 186, and exposing such aperture 128. As is well known, such a thumb notch 198 permits a person to manually grasp the CD 62 at the annular edge 129 of the aperture 128 and at the CD's circumferential or outer edge 136 for removing the CD 62 from the pocket 186 without touching either flat surface or side of the CD 62. In order that the CD 62 may be inserted into the CD pocket 186 with increased facility, an optional feature of the present invention provides the third panel 180 with creases or scores 200 across the rounded corners 202 where the thumb notch 198 proceeds from the substantially horizontal portion of the third panel's unsealed edge 192. These scores 200 permit the corners 202 to be folded therealong away from the second panel 162, forming ears 204 extending away from the inner surface of the rear cover 176 when the CD wallet 150 is in its open condition for permitting the CD 62 to be more easily guided into or received by the first opening 184 of the CD pocket 186.

A substantially rectangular fourth flexible plastic sheet or panel 206 is superposed on the inner surface of the CD wallet's front cover 174 and facing the second plastic panel 162. The fourth plastic panel 206 has a width dimension substantially the same as the width dimension of the first and second panels 152, 162, and a longitudinal dimension less than (preferably slightly less than) the longitudinal dimension of the front cover 174. The fourth panel 206 is of a thermoplastic sheet material, preferably a polyolefin such as polypropylene.

As shown in FIGS. 11 and 12, the fourth panel 206 is welded along three of its edges to the front cover 174, along the wallet's left, upper and right edges 158, 154, 160, by means of the welded edge seam 164. The fourth edge 208 of the fourth panel 206 remains unsealed, resulting in a second pocket 210 between the front cover 174 and the fourth panel 206 having an opening 212 preferably adjacent and parallel to or otherwise facing the spine 178. The second pocket 210 may be utilized to contain a document such as a booklet 214 containing notes relating to the information embedded in the CD 62. Such program notes document or booklet 214 typically includes an outer leaf having graphics thereon, and the fourth panel 206 is preferably transparent so that such program notes document outer graphics may be viewed therethrough when the CD wallet 150 is in its open condition.

In one suitable example of a CD wallet 150 fabricated of transparent 115 micron polypropylene first, third and fourth sheets 152, 180, 206 and a second panel 162 of one ounce spun or nonwoven polypropylene fabric laminated to a 60 micron polypropylene backing, for containing a CD 62 of nominally 120 millimeter diameter (approximately 4.724 inches) and 0.050 inch thickness, the wallet's front and rear covers 174, 176 were each approximately 4⅞ inches in their width dimension and approximately 5¹⁹⁄₃₂ inches in their longitudinal dimension with an approximately ³⁄₁₆ inch spine 178. The longitudinal dimension of the third and fourth panels 180, 206 was each approximately 5.453 inches, and the lowermost portion of the welded seam 188 along the circular arc 190 was spaced approximately ½ inch from the wallet's lower edge 156. In this example, the graphics sheet 140' was 12-point chip SBS paperboard, having width and longitudinal dimensions of 4⅝ inches and 11⅛ inches respectively, and having ¹⁄₃₂ inch scored lines 166 spaced to form a ³⁄₁₆ inch spine section 146'. The dimensional characteristics of the circular arc 190 and seam 188 were substantially in accordance with the previously described CD wallet 60 of FIG. 4.

Figure 16:
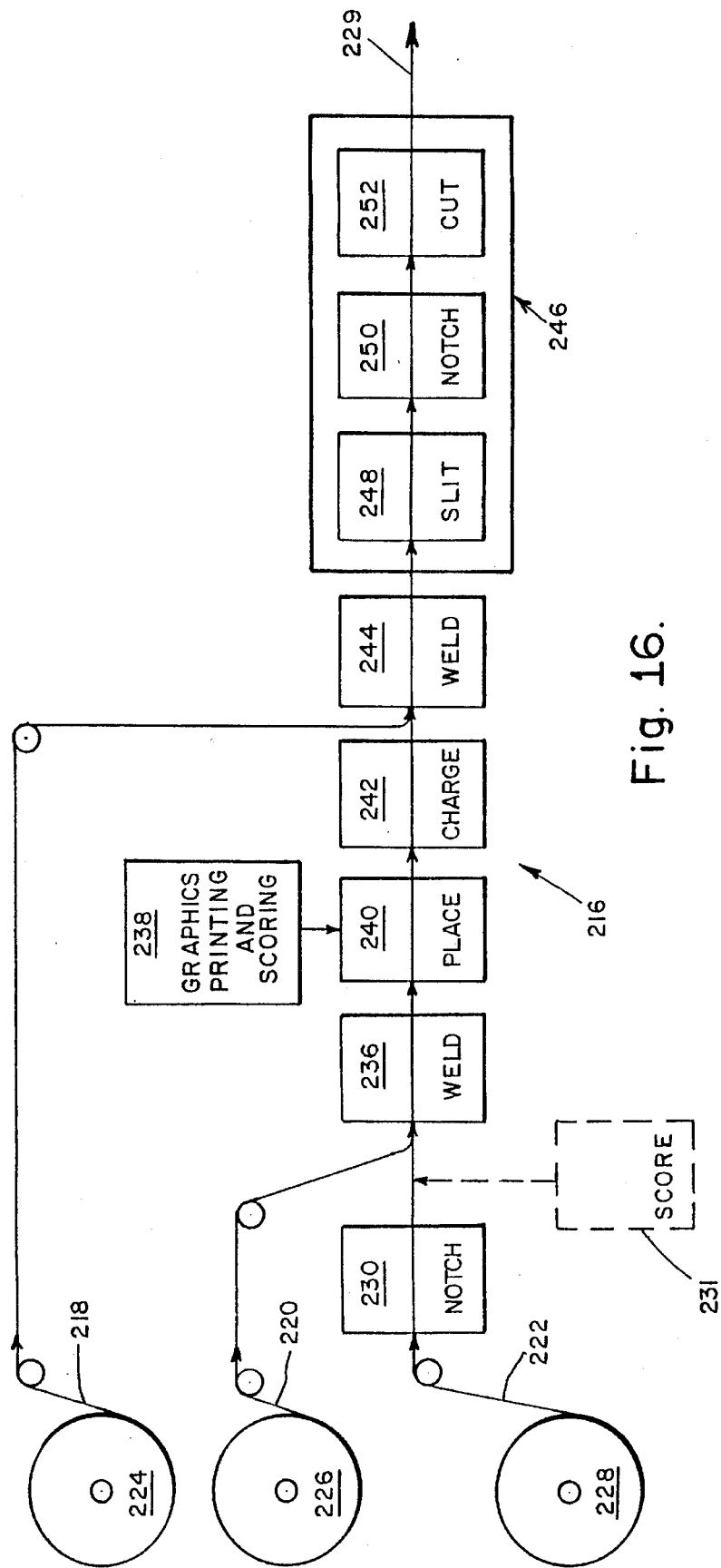
FIG. 16 is a flow diagram representing the method according to the present invention of fabricating the CD wallet of FIG. 11.
Figure 17:
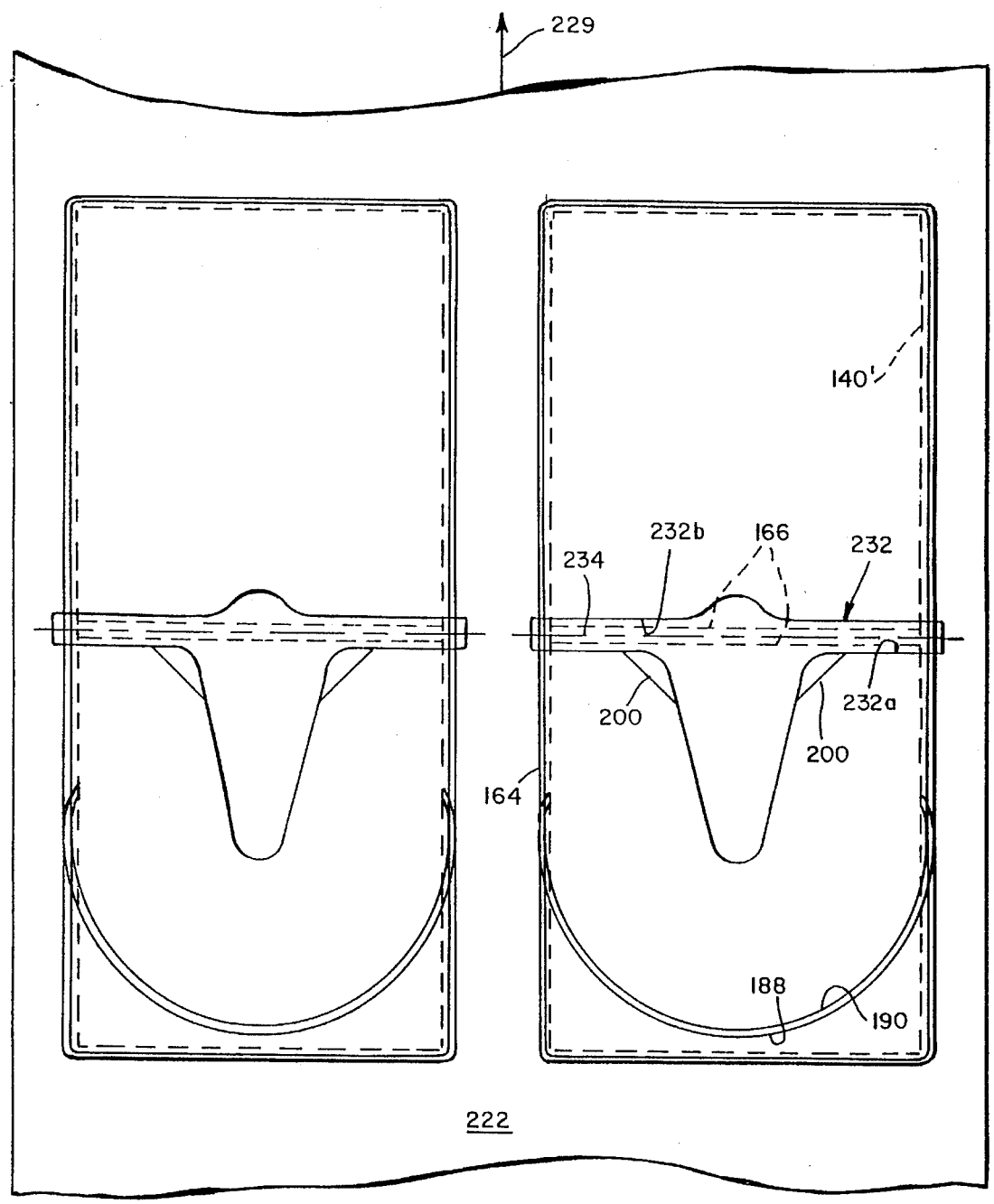
FIG. 17 is a bottom plan view of the superposed webs and graphics sheet assembly during fabrication of CD wallets as in FIG. 11, shown just before the slitting step represented in FIG. 16.

The method for fabricating the preferred embodiment of the CD wallet 150 shown in FIGS. 11 and 12, will be described with respect to FIGS. 16 and 17. There is represented in FIG. 16 thermoplastic sheet welding apparatus 216, which may be of a type manufactured by Paul Kiefel Hochfrequenc-Anlagen GmbH of Germany, such as its model KSV 600 high speed indexing automated welding unit with thermocontact welding capability, modified to incorporate additional functions as described below. In practicing the method for fabricating the CD wallet 150, a first flexible thermoplastic web 218, a second flexible thermoplastic web 220 and a third flexible thermoplastic web 222, from respective supply rolls 224, 226, 228, are horizontally advanced in a longitudinally extending direction, i.e. to the right as shown in the drawing of FIG. 16 as indicated by the arrow 229 and vertically as shown in the drawing of FIG. 17. The first web 218 provides the sheet material for the first panel 152 of the CD wallet 150, and the third web 222 provides the sheet material for the wallet's third and fourth panels 180, 206, and accordingly the webs 218, 222 are preferably transparent polypropylene sheet material, an example of which has a thickness of nominally 115 microns. The second web 220 provides the sheet material for the second panel 162, and accordingly is preferably an opaque polypropylene sheet material, for example a flexible polypropylene sheet material of say 115 to 250 micron thickness with one surface which may be embossed, or preferably a flexible polypropylene sheet material such as a one-ounce spun or nonwoven polypropylene fabric laminated to a 60 micron polypropylene backing as previously described, or alternatively a spun or nonwoven polypropylene fabric without a laminated backing. In the representation of FIG. 16, the second web 220 is transported with its nonwoven fabric surface (or embossed surface) facing downwardly toward the third web 222.

As indicated in FIG. 17, two wallets may be formed simultaneously in side by side relation; the method will be described herein in connection with only one CD wallet 150, it being understood that at least one other CD wallet may be simultaneously produced depending upon the width of the webs and the extent of tooling duplication at each work station. It may also be observed that FIG. 17 represents a bottom plan view of the three superposed webs 222, 220, 218 with the entrapped graphics sheet 140' at a point in the fabrication method just after the edge seam 164 is formed but before the welded together three plastic webs are cut about the edge seam 164 as hereinafter described.

Referring to FIG. 16, the third web 222 is transported to a notching station or tool 230 where an opening 232 (FIG. 17) is punched or cut through the third web 222. As shown in FIG. 17, the opening 232 is defined by two generally facing or obverse edges 232a, 232b of the cut third web 222, the obverse edges 232a, 232b respectively situated on opposite sides of a lateral line 238 (i.e. the imaginary line 238 is directed laterally of the longitudinal dimension or the direction of web transport, the lateral line 238 being in the horizontal dimension as viewed in the drawing of FIG. 17 and perpendicular to the plane of the drawing of FIG. 16). The cut opening 232 has a width dimension along the lateral line 234 greater than the width dimension of the wallet 150 being fabricated. Within the outline of the wallet's edge seam 164, the cut edge 232a has the same configuration as—and will become—the unsealed edge 182 of the wallet's third plastic panel 180, and the cut edge 232b has the same configuration as—and will become—the unsealed edge 208 of the wallet's fourth plastic panel 206.

The optional scores 200 across the rounded corners 202 (where the thumb notch 198 downwardly proceeds from the substantially horizontal portion of the cut edge 232a) may thereupon be applied by conventional scoring apparatus 231 (such as manufactured by Baier). The corners 202 may be folded along these scores 200 to produce the ears 204 shown in FIG. 11, and such folding may be performed by hand after fabrication of the CD wallet 150 has been completed.

The second web 220 is then superposed on the third web 222 as the third web 222 (with the cut opening 232) leaves the notching station 230 (or the optional scoring station 231 if implemented) and enters a welding station 236 where the second and third webs 220, 222 are welded together to form the seam 188 (or variations thereof as previously discussed) along the arc 190 concavely facing the lateral line 234. As previously indicated, the arc 190 has a diameter slightly greater than the diameter of the compact disc 62 and a center longitudinally spaced from the lateral line 234 by a distance greater than one-half the diameter of the compact disc 62 plus one-half the distance between the spaced parallel scores 166 of the graphics sheet 140' (FIG. 11). The seam 188, welding together the second and third webs 220, 222, may be implemented by known methods and apparatus for thermoplastic welding, such as ultrasonic welding utilizing, for example, a Branson Model 900 Series Ultrasonic Actuator manufactured by Branson Ultrasonics Corporation of Danbury, Conn.

The previously described graphics sheets 140' are provided, represented in FIG. 16 by the graphics printing and scoring block 238. The rectangular graphics sheets 140' are stacked and supplied to a placer apparatus 240 (such as a Reciprocating Placer Model NO. 22-211 RECTP manufactured by Thiele Engineering Company), which places a graphics sheet 140' on the welded together second and third webs 220, 222 (FIG. 17) with the graphics sheet's two parallel scores 166 situated respectively on opposite sides of, parallel to and equidistant from the lateral line 234, and with the graphics sheet's width dimension centered within the width dimension of the cut opening 232. The graphics sheet 140' is placed on the second web 220 with the graphics sheet's printed surface facing upwardly or away from the second web 220. Static charges are applied to the superposed graphics sheet 140' and the underlying welded together second and third webs 220, 222 by charger 242 (such as a Fantec Charging Generator Type DC-40), to attract the graphics sheet 140' to the welded together second and third webs 220, 222 for assuring that the position of the sheet 140' on the webs 220, 222 does not change during the subsequent welding step of the fabrication method.

After the graphics sheet 140' and second and third webs 220, 222 leave the charger 242, the first web 218 is superposed thereon in engagement with the graphics sheet 140'. The first, second and third webs 218, 220, 222 are thereupon welded together to form the seam 164 defining a rectangle having a width dimension slightly greater than twice the diameter of the compact disc 62 and a longitudinal dimension greater than twice the diameter of the compact disc 62 plus the distance between the two scores 166 on the graphics sheet 140', the longitudinal dimension of the rectangular seam 164 being bisected by the lateral line 234 and the width dimension of the rectangular seam 164 being contained within the width dimension of the opening 232 through the third web 222. The type of thermoplastic welding apparatus 244 employed depends upon the type of plastic sheet material utilized; for the polypropylene sheet material used for the webs 218, 220, 222, the rectangular seam 164 may be produced by ultrasonic welding techniques and apparatus known in the thermoplastic welding art, or by thermocontact welding techniques such as taught by U.S. Pat. No. 5,312,507 of William R. Miller, titled "Thermocontact Welding Method and Welded Product", incorporated herein by reference.

After the first, second and third webs 218, 220, 222 are welded together by the rectangular seam 164 with the graphics sheet 140' entrapped between the first and second webs 218, 220 and within the confines of the rectangular seam 164, the welded together first, second and third webs 218, 220, 222 are cut along the rectangle including the rectangular seam 164. This operation may be performed by cutting apparatus 246 as the welded together webs 218, 220, 222 advance along the transport path, and my be implemented by a rotary slitter 248 for cutting the webs along the longitudinally directed legs of the rectangular seam 164, a notching tool 250 for cutting about the four rounded corners of the seam 164, and a cutter for laterally cutting the webs along the lateral legs of the seam 164. It may be appreciated that, during the longitudinal cutting step implemented by the slitter 248, the resulting longitudinal cut traverses the portions of the third web opening 232 outside the rectangle of the rectangular weld 164, dividing the welded third web 222 into the wallet's third and fourth panels 180, 206. Similarly, the cut and welded second web 220 comprises the second panel 162 of the resulting CD wallet 150, and the cut and welded first web 218 comprises the first panel 152 of the resulting CD wallet 150.

After fabrication of the CD wallet is completed, the cut and welded together first and second webs 218, 220 (i.e. the first and second panels 152, 162 of the resulting CD wallet 150) and the graphics sheet 140' entrapped therebetween, are folded along the two parallel scores 166 with the cut first web 218 (i.e. the first panel 152) outwardly disposed. This step my be performed by hand, i.e. by folding the entrapped graphics sheet 140' along the scores 166, causing the more flexible first and second panels 152, 162 to bend or fold along the scores 166 of the more rigid entrapped graphics sheet 140'. Optionally, score lines (not shown) may be produced in the first and second panels 152, 162 in register with the score lines 166 of the entrapped graphics sheet 140' as a further step of the fabrication method, through utilization of conventional scoring apparatus such as manufactured by Baier.

Finally, the CD 62 corresponding to the information displayed by the graphics on the entrapped graphics sheet 140', is inserted in the CD pocket 186 of the resulting CD wallet 150 and the program notes document or booklet 214 may be inserted in the second pocket 210.

Thus there has been described a wallet for protectively storing a compact disc or CD, and in particular a CD wallet with entrapped graphics and dedicated to the storing of a particular CD, along with a method for fabricating the dedicated CD wallet. Other embodiments of the invention and other configurations of the embodiments presented herein, as well as modifications thereof and to the disclosed method, may be developed without departing from the essential characteristics thereof. Accordingly, the invention should be limited only by the scope of the claims listed below.

I claim:

1. A wallet for containing a compact disc, comprising the combination of:

a transparent substantially rectangular first flexible plastic panel and a substantially rectangular second flexible plastic panel of substantially the same dimensions as said first panel, said first and second panels welded together along four edges thereof;

a substantially rectangular graphics sheet interposed between said first and second panels and enclosed within the welded edges of said welded together first and second panels, said graphics sheet having graphics thereon viewable through said first panel;

said welded together first and second panels and said interposed graphics sheet foldable to form a front cover and a rear cover separated by a spine; and a third flexible plastic panel superposed on one of said covers and facing said second panel, said third panel welded along three edges thereof to three edges of said one cover forming a pocket between said one cover and said third panel having an opening along an unsealed edge of said third panel facing said spine for receiving the compact disc.

2. The wallet according to claim 1, further including:

a substantially rectangular fourth flexible plastic panel superposed on the other of said covers and facing said second panel, said fourth panel welded along three edges thereof to three edges of said other cover forming a pocket between said other cover and said fourth panel having an opening along an unsealed edge of said fourth panel facing said spine.

3. The wallet according to claim 1, wherein:

said graphics sheet includes two parallel scores along which said welded together first and second panels and said interposed graphics sheet are foldable to define said spine.

4. The wallet according to claim 3, wherein:

said graphics sheet has greater rigidity than said first panel.

5. The wallet according to claim 3, wherein:

said graphics sheet has greater rigidity than said second panel.

6. The wallet according to claim 3, wherein:

said graphics sheet has greater rigidity than said first and second superposed panels.

7. The wallet according to claim 1, wherein:

said third panel is welded to said second panel along a seam defining the depth in said pocket to which the compact disc may be inserted when received by said opening.

8. The wallet according to claim 7, wherein:

said seam is situated along a circular arc having a radius slightly greater than the radius of the compact disc and positioned on said second panel such that the entire disc is contained on said one cover when the disc is contained in said pocket.

9. The wallet according to claim 8, wherein:

said arc exceeds 180° and said seam includes welds at the termini of said arc defining a second opening of said pocket for permitting passage therethrough and into said arc of at least one-half but not the entirety of the disc when the disc is received by said opening along said unsealed edge.

10. The wallet according to claim 9, wherein:

substantially the entirety of the disc is contained in said pocket when said at least one-half of the disc is received by said second opening.

11. The wallet according to claim 1, wherein:

said second panel includes a nonwoven fabric bonded to a backing sheet with said backing sheet facing said graphics sheet.

12. The wallet according to claim 1, wherein:

said second panel includes a nonwoven fabric surface facing away from said graphics sheet.

13. The wallet according to claim 1, wherein:

said second panel includes an embossed surface facing away from said graphics sheet.

14. The wallet according to claim 1, wherein:

said unsealed edge of said third panel is configured with a thumb notch extending from rounded corners of said unsealed edge, said rounded corners being folded thereacross to form ears extending away from said second panel for facilitating entry of the compact disc into said pocket.

15. The wallet according to claim 1, wherein:

said welded together first and second panels include two parallel scores thereon in register with said scores of said graphics sheet interposed therebetween.

16. A wallet having a width dimension and a longitudinal dimension for containing a compact disc, comprising the combination of:

a compact disc having digital information embedded therein;

a substantially rectangular graphics sheet including graphics on one surface thereof relating to the information embodied in said compact disc, said graphics sheet having a width dimension and a longitudinal dimension respectively less than the width dimension and longitudinal dimension of the wallet, said graphics sheet including two parallel scores thereon along said sheet's width dimension and spaced from each other along said sheet's longitudinal dimension to define a spine therebetween substantially midway of said sheet's longitudinal dimension;

a transparent substantially rectangular first flexible plastic panel of greater flexibility than said graphics sheet, said first panel having a width dimension slightly greater than the diameter of said compact disc and a longitudinal dimension greater than twice the diameter of said compact disc plus the distance between said scores defining said spine;

a substantially rectangular second flexible plastic panel of substantially the same dimension as said first panel and of greater flexibility than said graphics sheet;

said first and second panels welded together along four edges thereof with said graphics sheet interposed therebetween and enclosed within said edges with said graphics viewable through said first panel, said welded together first and second panels and said interposed graphics sheet foldable along said scores with said first panel outwardly disposed to form a front cover and a rear cover separated by said spine; and a third flexible plastic panel superposed on said rear cover and facing said second panel, said third panel having a width dimension substantially the same as the width dimension of said rear cover and a longitudinal dimension less than the longitudinal dimension of said rear cover, said third panel welded along three edges thereof to three edges of said rear cover forming a first pocket between said rear cover and said third panel having a first opening along an unsealed edge of said third panel facing said spine for receiving said compact disc.

17. The wallet according to claim 16, further including:

a substantially rectangular fourth flexible plastic panel superposed on said front cover and facing said second panel, said fourth panel having a width dimension substantially the same as the width dimension of said front cover and a longitudinal dimension less than the longitudinal dimension of said front cover, said fourth panel welded along three edges thereof to three edges of said front cover forming a second pocket between said front cover and said third panel having an opening along an unsealed edge of said fourth panel facing said spine for receiving a document.

18. The wallet according to claim 17, wherein:

said first, second, third and fourth plastic panels are polypropylene sheet material.

19. The wallet according to claim 17, wherein:

said third panel is welded to said second panel along a seam defining the depth in said first pocket to which said compact disc may be inserted when received by said first opening.

20. The wallet according to claim 19, wherein:

said seam is situated along a circular arc having a radius slightly greater than the radius of said compact disc and positioned on said second panel such that the entirety of said disc is contained on said rear cover when said disc is contained in said first pocket.

21. The wallet according to claim 20, wherein:

said arc exceeds 180° and said seam includes welds at the termini of said arc defining therebetween a second opening of said first pocket for permitting passage therethrough and into said arc of at least one-half but not the entirety of said disc when said disc is received by said first opening.

22. The wallet according to claim 21, wherein:

the longitudinal dimension of said third panel is sufficiently great that substantially the entirety of said disc is contained in said first pocket when said at least one-half of said disc is received by said second opening.

23. The wallet according to claim 16, wherein:

said unsealed edge of said third panel is configured with a thumb notch extending from rounded corners of said unsealed edge, said rounded corners having scores thereacross for permitting said third panel to be folded along said scores to form ears extending away from said second panel for facilitating entry of said compact disc through said first opening and into said first pocket.

24. A method for fabricating a wallet having a width dimension and a longitudinal dimension for containing a compact disc, comprising the combination of:

providing a longitudinally extending transparent first flexible plastic web, a longitudinally extending second flexible plastic web and a longitudinally extending third flexible plastic web;

providing a rectangular graphics sheet having a longitudinal dimension and a width dimension respectively less than the longitudinal dimension of the wallet being fabricated, said graphics sheet including two parallel scores thereon along said sheet's width dimension and spaced from each other along said sheet's longitudinal dimension to define a spine therebetween substantially midway of said sheet's longitudinal dimension;

cutting said third web to form an opening therethrough having two generally obverse edges respectively on opposite sides of a lateral line and spaced therefrom, said opening having a width dimension along said lateral line greater than the width dimension of the wallet being fabricated;

superposing said second web on said third web;

welding said second and third webs together to form a seam along an arc concavely facing said lateral line, said arc having a diameter slightly greater than the diameter of the compact disc and a center longitudinally spaced from said lateral line by a distance greater than one-half the diameter of the compact disc plus one-half the distance between said scores defining said spine;

placing said graphics sheet on said second web with said two parallel scores respectively on opposite sides of said lateral line;

superposing said first web on said graphics sheet;

welding said first, second and third webs together to form a seam defining a rectangle having a width dimension slightly greater than the diameter of the compact disc and a longitudinal dimension greater than twice the diameter of the compact disc plus the distance between said two scores on said graphics sheet, the longitudinal dimension of said rectangle being bisected by said lateral line and the width dimension of said rectangle being contained within the width dimension of said opening through said third web; and cutting the welded together first, second and third webs along said rectangle including said rectangular seam.

25. The method according to claim 24, wherein:

during the graphics sheet providing step, said graphics sheet provided has greater rigidity than said first and second webs provided during the web providing step.

26. The method according to claim 25, further including, after cutting said welded together first, second and third webs, the step of:

folding the cut welded together first and second webs and said graphics sheet entrapped therebetween along said two parallel scores with said cut first web outwardly disposed.

27. The method according to claim 25, further including, after cutting said welded together first, second and third webs, the step of:

scoring said first and second webs in register with said scores on said graphics sheet entrapped therebetween.

28. The method according to claim 24, wherein:

said first, second and third webs provided during the web providing step are polypropylene webs.

29. The method according to claim 24, further including:

applying static charges to said graphics sheet and to said welded together second and third webs after placing said graphics sheet on said second web, for holding said graphics sheet on said second web.

30. The method according to claim 24, wherein:

during the step of cutting said third web to form said opening therethrough, configuring one of said obverse edges with a thumb notch extending from rounded corners of said one edge;

and further including, before superposing said second web on said third web, the step of scoring said third web across said rounded corners of said one obverse edge.

* * * * *